(12) United States Patent
Felch et al.

(10) Patent No.: US 12,415,738 B2
(45) Date of Patent: Sep. 16, 2025

(54) FLUOROCARBON DESTRUCTION METHOD

(71) Applicant: LUMMUS TECHNOLOGY LLC, Houston, TX (US)

(72) Inventors: Chad L. Felch, Kronenwetter, WI (US); Philip A. Burclaff, Weston, WI (US)

(73) Assignee: Lummus Technology LLC, Houston, TX (US)

( * ) Notice: Subject to any disclaimer, the term of this patent is extended or adjusted under 35 U.S.C. 154(b) by 478 days.

(21) Appl. No.: 17/779,596

(22) PCT Filed: Feb. 19, 2021

(86) PCT No.: PCT/US2021/018653
§ 371 (c)(1),
(2) Date: May 25, 2022

(87) PCT Pub. No.: WO2021/168167
PCT Pub. Date: Aug. 26, 2021

(65) Prior Publication Data
US 2023/0024923 A1   Jan. 26, 2023

Related U.S. Application Data

(60) Provisional application No. 62/979,480, filed on Feb. 21, 2020.

(51) Int. Cl.
*C02F 1/467* (2023.01)
*B01J 41/04* (2017.01)
(Continued)

(52) U.S. Cl.
CPC ............ *C02F 1/4672* (2013.01); *B01J 41/04* (2013.01); *B01J 49/57* (2017.01); *C02F 1/42* (2013.01);
(Continued)

(58) Field of Classification Search
CPC .. C25B 1/04; C25B 1/042; C25B 9/00; C25B 11/00; C02F 1/46104; C02F 1/461;
(Continued)

(56) References Cited

U.S. PATENT DOCUMENTS 9,221,695 B2   12/2015  Se
2009/0308760 A1  12/2009  Wei et al.
(Continued)

FOREIGN PATENT DOCUMENTS

CN         201416042 Y    3/2010
CN         102689948 A    9/2012
(Continued)

OTHER PUBLICATIONS

Liang Shangtao et al. / Electrochemical oxidation of PFOA and PFOS in concentrated waste streams, Remediation Journal, vol. 28, Issue 2 pp. 127-134. (Year: 2018).*
(Continued)

*Primary Examiner* — Magali P Slawski
*Assistant Examiner* — Bernadette Karen McGann
(74) *Attorney, Agent, or Firm* — Calfee, Halter & Griswold LLP

(57) ABSTRACT

A method of destroying a fluorocarbon compound includes regenerating an adsorbent to remove the fluorocarbon compound and to produce a regeneration fluid having a concentration of the fluorocarbon compound and directing the regeneration fluid to an electro-oxidation system. The method also includes applying a current to the electro-oxidation system to oxidize the fluorocarbon compound within the regeneration fluid and measuring a quantity of fluorides in the regeneration fluid to determine the progress of the removal of the fluorocarbon compound from the regeneration fluid.

10 Claims, 3 Drawing Sheets

(51) Int. Cl.
*B01J 49/57* (2017.01)
*C02F 1/42* (2023.01)
*C02F 101/36* (2006.01)

(52) U.S. Cl.
CPC ...... *C02F 2101/36* (2013.01); *C02F 2303/16* (2013.01)

(58) Field of Classification Search
CPC ........ C02F 1/46109; C02F 2001/46128; C02F 2201/46115; C02F 2201/46; C02F 2201/461; C02F 2201/46105; C02F 2201/4611; C02F 2201/46195; C02F 2201/46185; C02F 2201/4618; C02F 11/006; C02F 2001/422; C02F 2001/425; C02F 1/42; C02F 2101/36; C02F 2103/06; C02F 2101/305; C02F 1/4672; C02F 2103/02; C02F 2303/16; C25F 7/02; C25F 7/00; C25F 1/00; B01D 61/44; B01D 61/42; B01D 61/58; B01D 61/46; B01D 61/461; B01D 61/463; B01D 61/468; B01D 57/02; B01D 2325/26; B01D 17/06; B01D 2313/345; B01D 2313/00; B01J 35/0033; B01J 37/348; B01J 20/34; B01J 20/3441; B01J 20/3475; B01J 41/04; B01J 49/50; B01J 49/57

See application file for complete search history.

(56) References Cited

U.S. PATENT DOCUMENTS

| | | |
|---|---|---|
| 2014/0246366 A1 | 9/2014 | Kerfoot |
| 2015/0174440 A1 | 6/2015 | Huang et al. |
| 2015/0290484 A1 | 10/2015 | Hori et al. |
| 2016/0056416 A1 | 2/2016 | Flitsch et al. |
| 2018/0104921 A1 | 4/2018 | Beyad et al. |
| 2019/0185351 A1 | 6/2019 | Huang et al. |
| 2019/0241452 A1 | 8/2019 | Ball |
| 2021/0346862 A1 | 11/2021 | Georgi et al. |

FOREIGN PATENT DOCUMENTS

| | | |
|---|---|---|
| CN | 104971463 A | 10/2015 |
| CN | 105198047 A | 12/2015 |
| WO | 2018097875 A1 | 5/2018 |

OTHER PUBLICATIONS

Heard et al., "Electrode Materials in Modern Organic Electrochemistry," Angewandte Chemie, vol. 132, Issue 43, Oct. 19, 2020, pp. 19026-19044.

Xu et al., "Principle and Application of Microbial Fuel Cell," Harbin Institute of Technology Press, Nov. 30, 2012, p. 136.

Zhou et al., "Fundamentals of Electrode Process Dynamics," Wuhan University Press, Mar. 31, 1989, p. 180.

Li et al., "Technology and Engineering Example of Landfill Leachate Treatment," China Environmental Science Press, Aug. 31, 2008, p. 140.

Wang, "Study on Water Management Model of Proton Exchange Membrane Fuel Cell", Chinese Master's Theses Full-Text Database-Engineering Science and Technology I, Issue 11, Nov. 15, 2018, pp. C042-322.

Qiao, "Development of Ultra-High Current Density Ion Membrane Electrolyzer", Chinese Master's Theses Full-Text Database-Engineering Science and Technology I, Issue 1, Jan. 15, 2019, pp. B015-207.

Yang Bo et al.: "Electrochemical mineralization of perfluorooctane sulfonate by novel F and Sb co-doped Ti/SnO2electrode containing Sn—Sb interlayer", Chemical Engeneering Journal, Elsevier, Amsterdam, NL, vol. 316, Date Jan. 28, 2017 (Jan. 28, 2017), pp. 296-304, XP029940565, ISSN: 1385-8947, 001: 10.1016/J.CEJ. 2017.01 .105.

Liang, Shangtao et al.: "Electrochemical oxidation of PFOA and PFOS in concentrated waste streams", Remediation, vol. 28, No. 2, Date : Mar. 1, 2018 (Mar. 1, 2018), pp. 127-134, XP055806689, US ISSN: 1051-5658, DOI: 10.1002/rem.21554.

PCT International Search Report and Written Opinion of International Searching Authority mailed Jun. 8, 2021 corresponding to PCT International Application No. PCT/US2021/018653 filed Feb. 19, 2021.

Liang Shangtao et al. / Electrochemical oxidation of PFOA and PFOS in concentrated waste streams, Remediation Journal, vol. 28, Issue 2 pp. 127-134.

Hori Hisao et al. / Efficient mineralization of hydroperfluorocarboxylic acids with persulfate in hot water, Hori Hisao et al., Catalysis Today 151 (2010) pp. 131-136, / Nov. 3, 2010.

\* cited by examiner

FLUOROCARBON DESTRUCTION METHOD

BACKGROUND

Per- and polyfluorinated alkyl substances (PFAS) are a growing concern as a contaminant of ground and drinking water as their negative health effects are becoming clearer. There is discussion of PFAS regulatory limits for drinking water being established on a federal level.

BRIEF SUMMARY

In one construction, a method of destroying a fluorocarbon compound in a flow of water includes directing the flow of water into a tank containing an ion-exchange resin, removing the fluorocarbon compound from the flow of water by facilitating the adsorption of the fluorocarbon compound with the ion-exchange resin, and periodically regenerating the ion-exchange resin to allow for re-use of the ion-exchange resin. The process of regeneration includes placing the ion-exchange resin in a regeneration fluid, the fluorocarbon compound de-adsorbing from the ion-exchange resin and collecting in the regeneration fluid, directing the regeneration fluid to an electro-oxidation system, applying a current to the electro-oxidation system to oxidize the fluorocarbon compound within the regeneration fluid, and analyzing a quantity of fluorides in the regeneration fluid to determine the progress of the removal of the fluorocarbon compound from the regeneration fluid.

In another construction, a method of destroying a fluorocarbon compound includes regenerating an adsorbent to remove the fluorocarbon compound and to produce a regeneration fluid having a concentration of the fluorocarbon compound and directing the regeneration fluid to an electro-oxidation system. The method also includes applying a current to the electro-oxidation system to oxidize the fluorocarbon compound within the regeneration fluid and measuring a quantity of fluorides in the regeneration fluid to determine the progress of the removal of the fluorocarbon compound from the regeneration fluid.

In yet another construction, a method of destroying a fluorocarbon compound in a flow of water includes directing the flow of water into a tank containing an adsorbent, removing the fluorocarbon compound from the flow of water by facilitating the adsorption of the fluorocarbon compound with the adsorbent, and periodically regenerating the ion-exchange resin to allow for re-use of the ion-exchange resin. The process of regeneration includes placing the ion-exchange resin in a regeneration fluid, the fluorocarbon compound de-adsorbing from the adsorbent and collecting in the regeneration fluid and directing the regeneration fluid to an electro-oxidation system. The method further includes applying a current to the electro-oxidation system to oxidize the fluorocarbon compound within the regeneration fluid and measuring a quantity of fluorides in the regeneration fluid to determine the progress of the removal of the fluorocarbon compound from the regeneration fluid.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
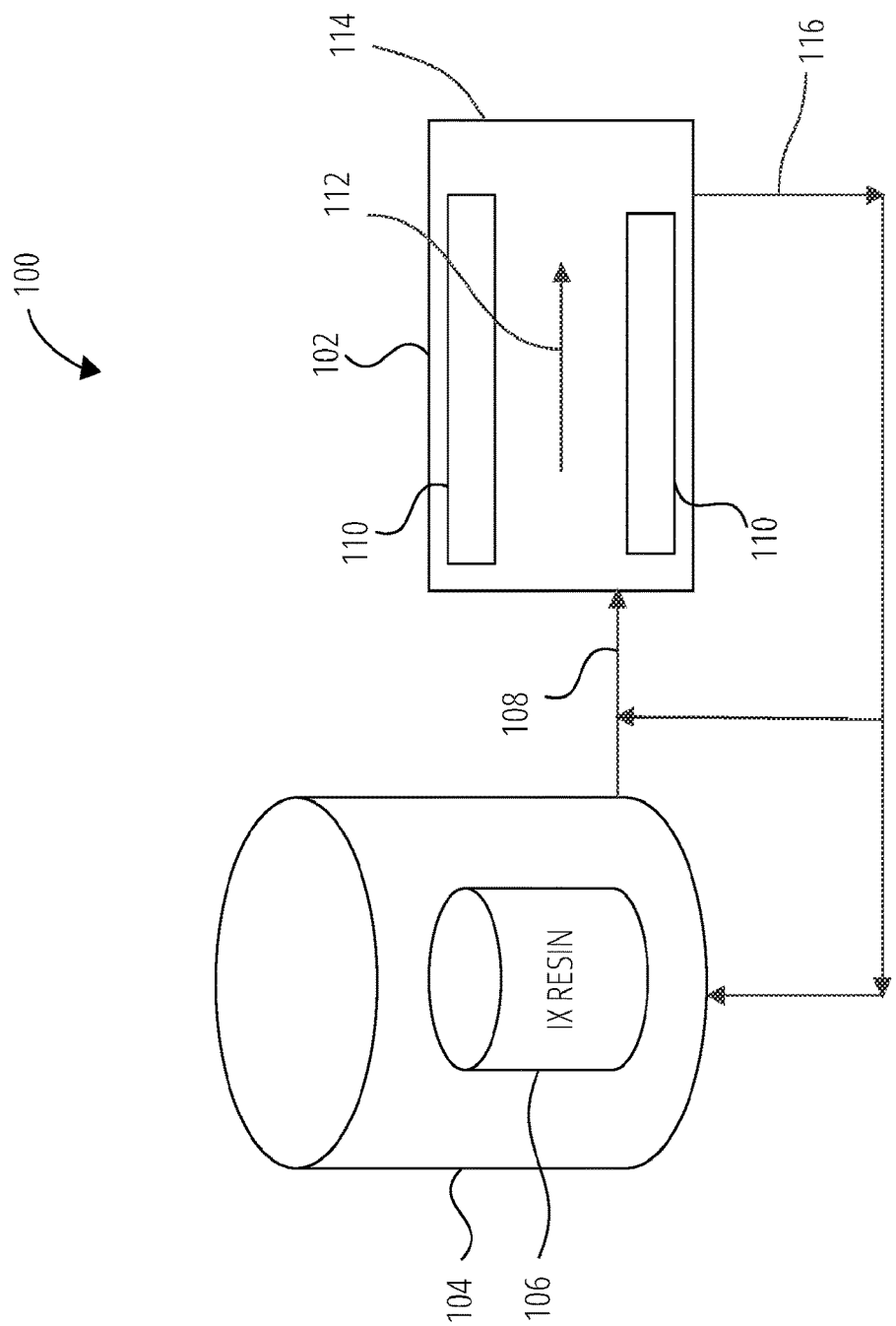
FIG. 1 illustrates a fluorocarbon destruction system 100 in accordance with one embodiment.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

As a fluorocarbon, PFAS does not biodegrade and thus needs some form of advanced oxidation in order to be destroyed. While there has been success using ion exchange or other adsorbents (e.g., charcoal, activated charcoal, etc.) to remove PFAS from water, those systems produce a media coated in PFAS or a regeneration fluid with concentrated PFAS that still requires careful handling. In present systems, an ion exchange (IX) resin or adsorbent is incinerated. This process assumes that the PFAS is destroyed during incineration. However, this process is expensive as the resin can only be used one time before destruction and it is difficult to ensure that the PFAS is actually destroyed and not just discharged into the air with the exhaust produced during incineration.

FIG. 1 illustrates a fluorocarbon destruction system 100 that includes an electro-oxidation system 102 that is able to take concentrated PFAS and oxidize it, thereby destroying the contaminant instead of just moving it from one substance or state to another.

Electro-oxidation is a treatment process that flows water 112 between electrodes 110 while simultaneously passing an electrical current through the electrodes 110. As the electrical current jumps between the electrodes 110 and through the water 112, it rips apart some of the water molecules, forming hydroxyl radicals and hydrogen gas. The hydroxyl radicals are incredibly strong oxidizers that are able to oxidize and mineralize organic molecules they encounter, including fluorocarbons. The PFAS is thus converted to carbon dioxide and fluoride ions, thereby removing the contamination that was the original concern.

To effectively treat water using the fluorocarbon destruction system 100 of FIG. 1, the water 112 should be electrically conductive. As PFAS concentration decreases, the electrical conductivity of the water 112 also decreases. To improve the effectiveness of the electro-oxidation process, one process uses IX resin 106 to initially treat the contaminated water. When required, the IX resin 106 is regenerated in a regeneration system 104, thereby making the IX resin 106 well-suited to reuse. The liquid used and produced (the feed 108) during the regeneration of the IX resin 106 will have a much higher concentration of PFAS then did the original contaminated water that was treated and will therefore be more electrically conductive and better suited to the electro-oxidation process. If needed, salt can be added to the feed 108 to make it sufficiently conductive for effective treatment using the electro-oxidation system 102. The more concentrated PFAS will make the electro-oxidation system 102 more efficient than it would be treating the original contaminated water directly.

By using electro-oxidation to treat the PFAS in the regeneration fluid (feed 108), rather than incinerating the IX resin 106, the IX resin 106 can be reused, potentially many times. Considering the low level of PFAS in ground/drinking water, it is likely that regenerations will be infrequent. Thus, the electro-oxidation system 102 of FIG. 1 can be relatively small such that the use of the electro-oxidation system 102 will make economic sense compared to replacing IX resin 106.

In one test, PFOS (perfluorooctanesulfonic acid, $C_8HF_{17}O_3S$) was used as a representative PFAS compound and the electro-oxidation system 102 of FIG. 1 was used to test the ability of electro-oxidation to destroy the fluorocarbon. A feed solution (feed 108) was synthesized by adding NaCl (i.e., salt) and PFOS to de-ionized water (DI). In addition to seeing if the electro-oxidation system 102 was able to oxidize the PFOS, it was also a goal to see if non-purgeable organic carbon (NPOC) or fluorides could be used as a proxy analysis instead of needing to analyze for PFOS.

The feed solution (feed 1080 had quite a bit less PFOS than targeted in the test, because the PFOS coated the piping and equipment rather than staying entirely in solution. The PFOS concentration was reduced significantly, down to about 0.05 mg/L remaining in the effluent, a >99.5% reduction. However, the fluorides analysis suggested that a portion of the original PFOS molecules only partially oxidized to some smaller fluorinated organic compound as the final fluoride concentration was lower than was expected had the PFOS fully mineralized.

Figure 2:
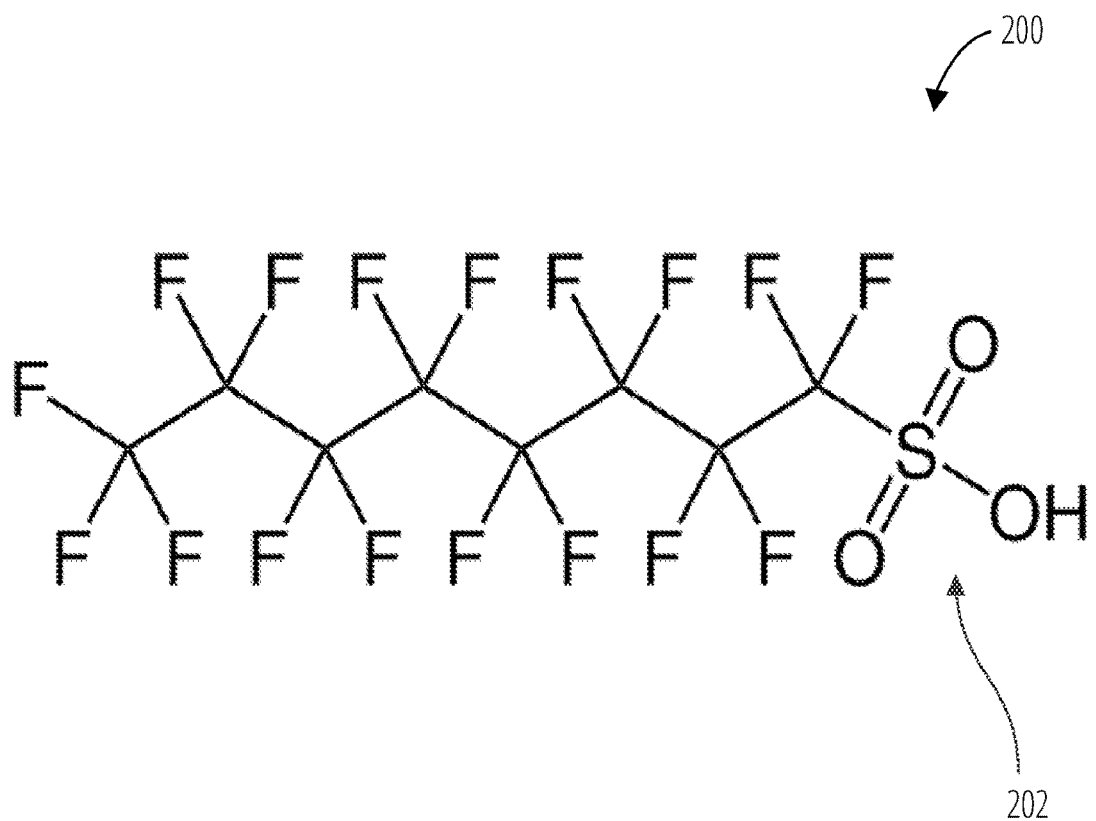
FIG. 2 illustrates the molecular structure of PFAS 200.
Figure 3:
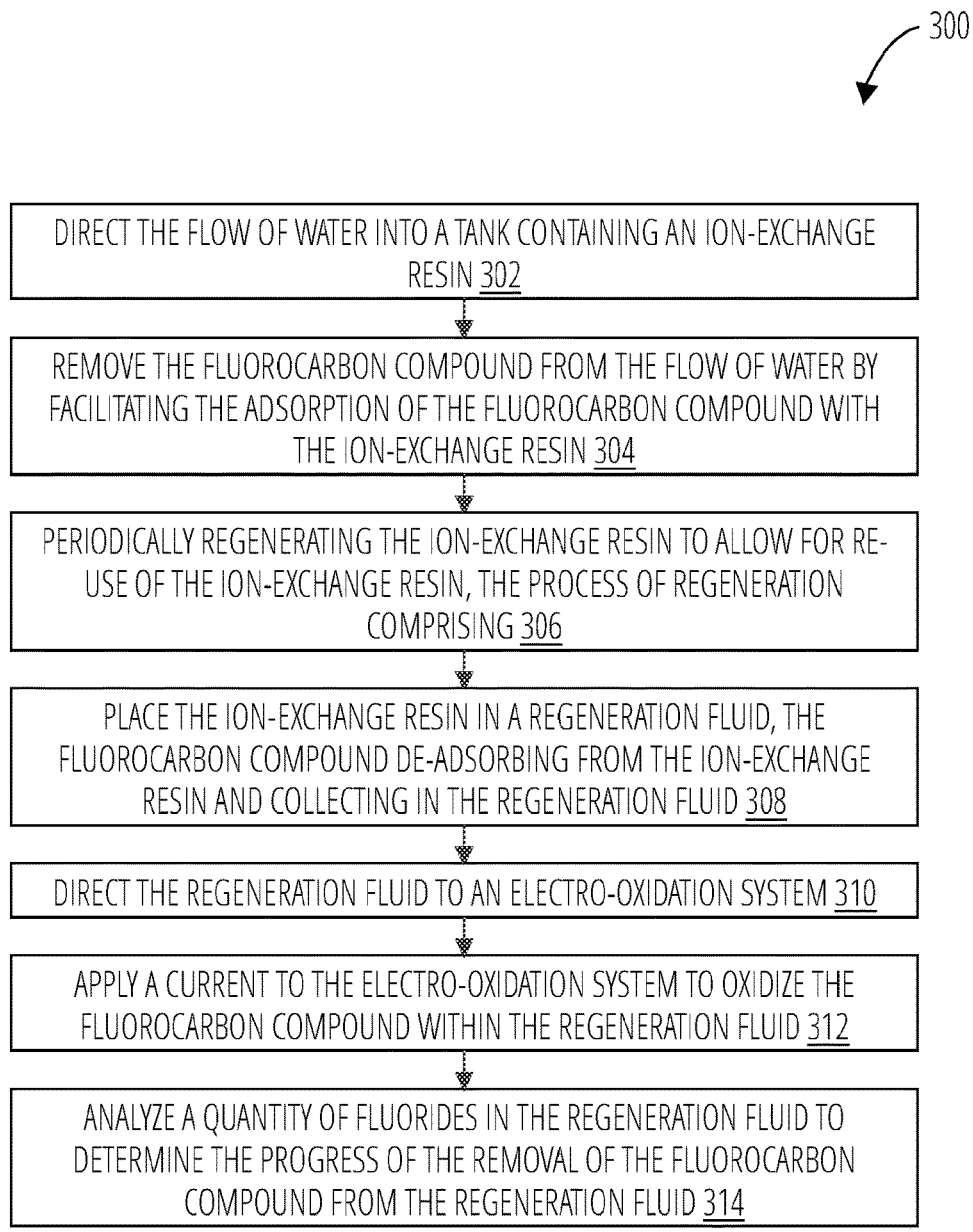
FIG. 3 is a flowchart illustrating a method of removing fluorocarbon compounds from a flow of fluid 300 in accordance with one embodiment.

As noted above, for testing, perfluorooctanesulfonic acid (PFOS), $C_8HF_{17}O_3S$, was chosen as the contaminant to represent PFAS. The main issue in destroying PFAS is the long carbon chain full of fluorine, the specific functional group 202 on the end is expected to have minimal effect on the ability of electro-oxidation to oxidize the compound. FIG. 2 illustrates the molecular structure of PFAS 200.

The testing was performed in the electro-oxidation system 102 of FIG. 1 in order to minimize the amount of PFOS waste in the case that electro-oxidation was unsuccessful.

The electro-oxidation system 102 was filled with 50 L of DI water and 1.0 kg of NaCl was added to provide the conductivity necessary for electro-oxidation to work. This solution was circulated through the electro-oxidation system 102 for five minutes and then a sample was taken as a system blank to assure no unwanted compounds were in the system. The feed 108 was completed by adding 5 mL of 40% PFOS in water solution, with the goal of making a 50 mg/L feed solution. This solution is very concentrated relative to the proposed PFAS regulatory limits and assumes that IX resin 106 or such has been used already to collect the PFAS from the water 112 being treated and concentrated via IX resin 106 regeneration.

PFOS was frequently used as a coating to alter the surface properties of materials, thus there was concern that the PFOS would coat the piping/tank rather than staying in solution. Thus, after adding the PFOS, the feed 108 was circulated for five minutes without the electro-oxidation system 102 being powered to allow any mixing/coating that would happen before the initial feed sample was collected.

The test was started with the electro-oxidation system 102 operating at a low current density of 5000 A/m². It was expected that the low organics concentration would make any higher current densities inefficient. Samples were collected approximately once per day and, after three days, the electro-oxidation system 102 was stopped to allow time for sample analysis to decide if additional treatment was needed. Due to testing delays, it was decided to continue treatment without regard to the results. For the second half of the testing (starting at 73 hours), the current density was increased to 15,000 A/m².

| Name | NPOC mg/L | Fluorides mg/L | PFOS mg/L | pH |
|---|---|---|---|---|
| system blank | 3.90 | 0.08 | ND | |
| Initial Feed | 5.98 | 0.09 | 14.4 | |
| 4 hours | 14.5 | 0.21 | 14.2 | |
| 24 hours | 52.0 | 2.15 | 7.23 | 8.6 |
| 49 hours | 77.1 | 4.77 | 1.51 | 8.8 |
| 73 hours | 64.4 | 5.34 | | 8.9 |
| 97 hours | 46.0 | 5.80 | 0.0357 | 9.0 |
| 121 hours | 34.4 | 6.58 | | 9.0 |
| 145 hours | 26.5 | 6.58 | 0.0738 | 9.0 |

The feed 108 had a much lower PFOS concentration than desired, however enough PFOS remained in solution to allow for meaningful results. As the electro-oxidation treatment progressed, there was no foaming in the tank 114, which was a concern since PFOS is a surfactant. For the first half of the test (system blank—49 hours) with the low current density, the water temperature stayed low and very little water makeup was required. The second half of the test, with the higher current density warmed the water 112 slightly and needed some additional water make-up.

The most notable event during this treatment occurred after restarting at the higher current density. The feed 108 started out clear and stayed that way for the first half of the test. However, following the first day of testing at the higher current, the water 112 was a very dark black. The water 112 remained black for the rest of the test. When the test was completed and the water 112 allowed to settle, a thin layer of fine black silt settled to the bottom of the tank 114. The remaining water 112 was still clear, as only the solids caused the dark color.

There were two theories as to the cause of the solids. First, it was thought that the surface of a diamond electrode in the electro-oxidation system 102 might have been converted to graphite which would resemble the solids. This might be caused by operating at high current densities with low organics or alternatively, the fluorides in the water 112 caused an unusually harsh oxidative environment at the electrode surface. Second, it is possibly that the PFOS was partially oxidized into a form that polymerized either on its own or with residual organics in the electro-oxidation system 102 to form the solids and the delay between the first half and the second half of the testing allowed this to happen rather than the higher current density.

Due to the difficulty of the PFOS analysis, it was hoped that NPOC and/or fluorides could be used as a proxy for the determination of the level of PFOS destruction. The measured level of NPOCs would be indicative of the conversion of the carbon chain into $CO_2$ and the measured level of fluorides would be indicative of the breaking of the C—F bonds to release unbonded fluoride ions into the water 112. PFOS has the chemical formula $C_8HF_{17}O_3S$ and molar mass of 500 g/mol. Of that mass, it is 19% carbon and 65% fluorine.

For a feed 108 with a PFOS concentration of 14.4 mg/L, it would be expected that the NPOC would increase by 14.4*19%=2.7 mg/L. Unfortunately, between the system blank and the initial feed, the NPOC only increased by 2.1 mg/L, missing over 20% of the PFOS NPOC. More problematically, the NPOC increased significantly over the first half of the testing before dropping in the second half. The final NPOC measurement was still significantly higher than the feed 108, thereby making it a poor proxy.

The fluorides appear to be the best option as a proxy. Unlike the NPOC or PFOS analyses, fluorides will show up only as the PFOS is oxidized and the C—F bonds are broken to release fluoride ions into the water. Further, fluorine is generally uncommon in organic molecules, so there should be no outside contamination of fluoride like might be the case with NPOC.

As expected, the fluoride measurements started quite low and increased as the PFOS decreased over the course of the test. Calculating the ratio of fluorides to destroyed PFOS yielded the following results:

| Sample | F- added mg/L | PFOS reduced mg/L | Ratio |
|---|---|---|---|
| Initial Feed | 0 | 0 | — |
| 4 hours | 0.12 | 0.2 | 0.60 |
| 24 hours | 2.06 | 7.17 | 0.29 |
| 49 hours | 4.68 | 12.89 | 0.36 |
| 97 hours | 5.71 | 14.36 | 0.40 |
| 145 hours | 6.49 | 14.33 | 0.45 |

While the fluorides correlate with the PFOS reduction, in every sample of this test, the ratio of increased fluoride to decreased PFOS is quite a bit lower than 0.65. This indicates that rather than mineralizing completely, the PFOS is partially oxidizing to some intermediate fluorocarbon that does not show up as PFOS in the chromatography analysis. This is especially clear in the last two samples when the PFOS is already nearly completely gone but the fluorides continue to increase quite a bit. Thus, measuring the fluorides might be an even better way to monitor reaction progress as they will monitor every fluorinated organic molecule being oxidized rather than any specific one.

The just-described testing resulted in evidence supporting the proof-of-concept that an electro-oxidation system 102 can be used to significantly mineralize PFOS and other fluorinated organic molecules, and that measuring the fluorides in the water has potential as a good proxy analysis for monitoring the progress of the treatment.

The PFOS concentration in the electro-oxidation system 102 after treatment was around 0.05 mg/L (50,000 ppt) which, while much higher than the 70 ppt proposed regulation, is a >99.5% reduction from the feed PFOS amount. This indicates that the electro-oxidation system 102 cannot be used alone to treat water for the regulation, but if paired with a regenerable adsorbent or ion exchange resin, electro-oxidation can be used to actually destroy the problematic compounds instead of just removing them from the drinking/ground water and moving them into a different reject stream. The treated effluent 116 would either need to be passed through the IX resin 106 again to remove the last bit to meet the proposed regulations, or if possible, might be reused for the next regeneration of the IX resin 106 or adsorbent.

However, it is important to note that PFOS was just a representative PFAS. It is possible that the partially oxidized byproducts are still problematic. The quantity of fluorinated organics remaining in the treated effluent 116 can be estimated: The feed 14.4 mg/L PFOS was associated with 9.36 mg/L fluorine. 6.49 mg/L of that fluorine ended up as fluoride, leaving 2.87 mg/L fluorine that might still be associated with organic molecules.

In block 302, a method of removing fluorocarbon compounds from a flow of fluid 300 directs the flow of water into a tank containing an ion-exchange resin 106. In block 304, the method of removing fluorocarbon compounds from a flow of fluid 300 removes the fluorocarbon compound from the flow of water by facilitating the adsorption of the fluorocarbon compound with the IX resin 106. In block 306, the method of removing fluorocarbon compounds from a flow of fluid 300 includes periodically regenerating the IX resin 106 to allow for re-use of the IX resin 106. The process of regeneration includes, in block 308, placing the IX resin 106 in a regeneration fluid, the fluorocarbon compound de-adsorbing from the IX resin 106 and collecting in the regeneration fluid. In block 310, the regeneration fluid, in the form of a feed 108 is directed to an electro-oxidation system 102. In block 312, a current is applied to the electro-oxidation system 102 to oxidize the fluorocarbon compound within the regeneration fluid (water 112). In block 314, the quantity of fluorides is analyzed in the regeneration fluid (water 112) to determine the progress of the removal of the fluorocarbon compound from the regeneration fluid (water 112).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of destroying a fluorocarbon compound, the method comprising:
    regenerating an adsorbent to remove the fluorocarbon compound and to produce a regeneration fluid having a concentration of the fluorocarbon compound;
    directing the regeneration fluid to an electro-oxidation system;
    applying a current to the electro-oxidation system to oxidize the fluorocarbon compound within the regeneration fluid; and
    measuring a quantity of fluorides in the regeneration fluid to determine the progress of the removal of the fluorocarbon compound from the regeneration fluid;
    wherein the current has a current density of at least 5,000 A/m$^2$.

2. The method of claim 1, wherein the current density is at least 15,000 A/m$^2$.

3. The method of claim 1, further comprising measuring the total fluorocarbon input into the electro-oxidation system.

4. The method of claim 1, wherein the adsorbent includes an ion-exchange resin.

5. The method of claim 1, wherein the fluorocarbon compound includes per- and polyfluorinated alkyl substances (PFAS).

6. A method of destroying a fluorocarbon compound in a flow of water, the method composing:
    directing the flow of water into a tank containing an adsorbent;
    removing the fluorocarbon compound from the flow of water by facilitating the adsorption of the fluorocarbon compound with the adsorbent;
    periodically regenerating the adsorbent to allow for re-use of the adsorbent, the process of regeneration comprising,
        placing the adsorbent in a regeneration fluid, the fluorocarbon compound de-adsorbing from the adsorbent and collecting in the regeneration fluid;
        directing the regeneration fluid to an electro-oxidation system;
        applying a current to the electro-oxidation system to oxidize the fluorocarbon compound within the regeneration fluid; and
        measuring a quantity of fluorides in the regeneration fluid to determine the progress of the removal of the fluorocarbon compound from the regeneration fluid;
    wherein the current has a current density of at least 5,000 A/m$^2$.

7. The method of claim 6, wherein the current density is at least 15,000 A/m$^2$.

8. The method of claim 6, further comprising measuring the total fluorocarbon input into the electro-oxidation system.

9. The method of claim 6, wherein the adsorbent includes an ion-exchange resin.

10. The method of claim 6, wherein the fluorocarbon compound includes per- and polyfluorinated alkyl substances (PFAS).

* * * * *